June 6, 1933.       H. D. GEYER       1,913,198
UNIVERSAL JOINT
Filed July 16, 1932

Patented June 6, 1933

1,913,198

UNITED STATES PATENT OFFICE

HARVEY D. GEYER, OF DAYTON, OHIO, ASSIGNOR TO INLAND MANUFACTURING COMPANY, OF DAYTON, OHIO, A CORPORATION OF DELAWARE

UNIVERSAL JOINT

Application filed July 16, 1932. Serial No. 622,845.

This invention relates to resilient joints and particularly to an improved method of assembling the joint parts.

It is an object of the invention to provide a simple and economical method of inserting between two parts to be joined a rubber or other resilient body, which is of a size greater than the space through which it is to be introduced.

Figure 1:
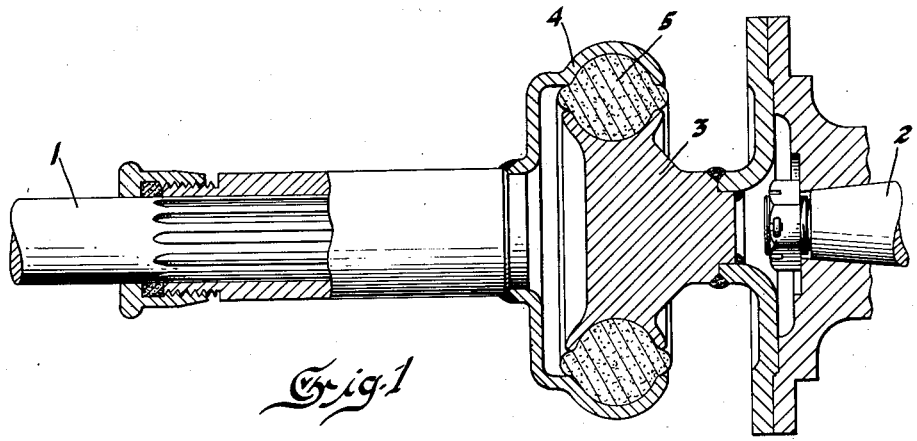
Figure 2:
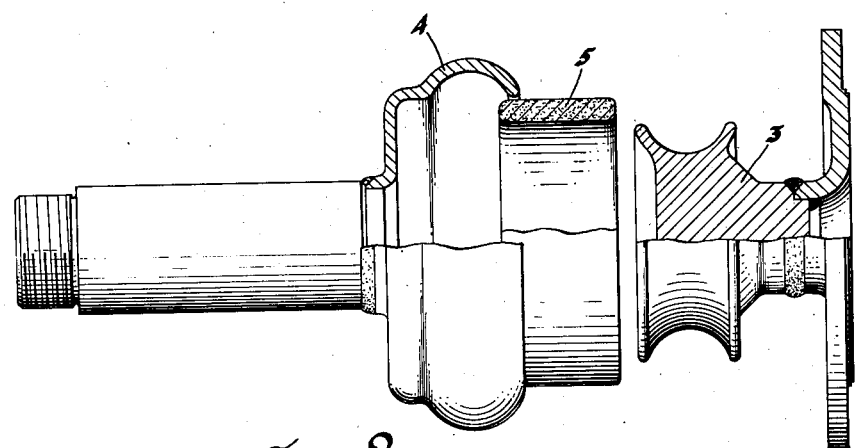

For the purpose of disclosure use is made of the accompanying drawing wherein Figure 1 is a sectional view of a universal joint, and Figure 2 is a view partly in section of the joint parts prior to final assembly.

While a universal driving joint is herein specifically referred to, it is to be understood that the invention relates broadly to the various types of connections in general use, where rubber or other similar material is employed for accommodating or cushioning relative movement for damping sound and for other well known purposes.

In the drawing, the numerals 1 and 2 indicate power transmission shafts, either of which may be the driving or driven element. Associated with the shaft 2 is an inner member or hub 3, and associated with the shaft 1 is an outer member or housing 4, the inner and outer members having complementary annular grooves that form seats for a cushioning ring or band 5.

In this particular installation the ring 5 of rubber or other elastic deformable material is held within the seats under an initial pressure with its surfaces in frictional engagement with the mating surfaces of the seats so as to transmit the drive from one to the other of the parts joined thereby. Because the space presented for the introduction of the rubber body between the members is quite small, and also because the rubber is to be held under pressure and is therefore of an initial size much greater than the space within which it is to be finally located, it is here proposed to give it a temporary set in a shape that will facilitate assembly. Accordingly, the rubber band is first placed in a suitable pressure applying device by which a deformation of the rubber is effected to bring it to a size and shape which will permit the band to be easily fitted to the inner and outer members. The deformed body is then given a temporary set by reducing its temperature through the use of liquid air, or other suitable freezing means, to approximately 80° F. below zero. The frozen ring can be easily placed between the joint parts and when so positioned permitted to return to normal room temperature. As the ring absorbs heat and thaws out it expands into tight seating and interlocking engagement with both the hub 3 and housing 4.

I claim:

1. The method of connecting parts which includes shaping by pressure a resilient body for easy insertion between the parts to be connected, then subjecting the shaped body to a temperature which causes it to take a temporary set and so inserting it between the parts, and finally bringing the body toward room temperature to break the set.

2. The method of placing a resilient body between two parts, which includes deforming the body to a shape which will permit its easy insertion between the parts, absorbing heat from the body to give it a temporary set in its deformed state and then inserting the body between the parts and allowing it to absorb heat to break its set.

3. Placing an elastic deformable body within a space smaller in one dimension than the normal size of a complemental dimension of the body by freezing the body in a contracted state and so inserting it within the space and then thawing the body to expand the same within the space.

4. In the formation of a resilient joint in which an elastic deformable body is held under pressure between two parts, the method of fitting the body to the parts, which includes deforming the body to a shape to permit its easy insertion between the parts, giving the deformed body a temporary set by reducing its temperature and breaking the temporary setting after insertion by raising its temperature.

5. The method of placing a rubber band within complementary socketed seats formed in telescoped inner and outer members, which includes initially deforming the band to a shape to easily enter between the members, then freezing the band in its deformed state and placing it between the members and finally thawing the band to allow partial restoration within the confines of said seats.

6. The method of placing within a given space a rubber body of an initial size greater than the space to receive it, which includes bringing the body to an abnormal temperature for the purpose of giving it a temporary set in a shape to easily enter said space and then restoring the body to normal temperature within the space.

In testimony whereof I affix my signature.

HARVEY D. GEYER.